United States Patent [19]
Egusa et al.

[11] 3,817,008
[45] June 18, 1974

[54] APPARATUS APPLIED TO MACHINE TOOLS AND OTHERS FOR TRANSFERING WORKPIECES

[75] Inventors: Tomoyoshi Egusa; Ichiro Nakagami, both of Iwata, Japan

[73] Assignee: Toyo Bearing Manufacturing Company Limited, Osaka-shi, Japan

[22] Filed: May 30, 1972

[21] Appl. No.: 257,804

[30] Foreign Application Priority Data
Oct. 21, 1971   Japan................................ 46-83730

[52] U.S. Cl............................ 51/215 HM, 51/215 H
[51] Int. Cl......................... B24b 47/20, B24b 5/32
[58] Field of Search ...... 51/215 HM, 215 R, 215 H, 51/215 AR, 215 CP; 214/1 BC, 1 BD

[56] References Cited
UNITED STATES PATENTS

| 3,226,886 | 1/1966 | Seidel | 51/215 R |
|---|---|---|---|
| 3,546,823 | 12/1970 | Uhtenwoldt | 51/215 HM |
| 3,619,951 | 11/1971 | Kikuchi | 51/215 R X |
| 3,640,026 | 2/1972 | Flanigan | 51/215 R |
| 3,670,461 | 6/1972 | Hori | 51/215 HM |

*Primary Examiner*—Donald G. Kelly
*Attorney, Agent, or Firm*—Hall & Houghton

[57]   ABSTRACT

A workpiece transfer apparatus having elements moving in timed relation to feed workpieces from a chute to a machine tool work machining support and, subsequently, to a machined workpiece receiving chute. A distribution element passes a workpiece from the feed chute to a pivotal receiving element, simultaneously pushing a finished workpiece into the receiving chute. The receiving element acts to move each workpiece to and from the machining support.

6 Claims, 11 Drawing Figures

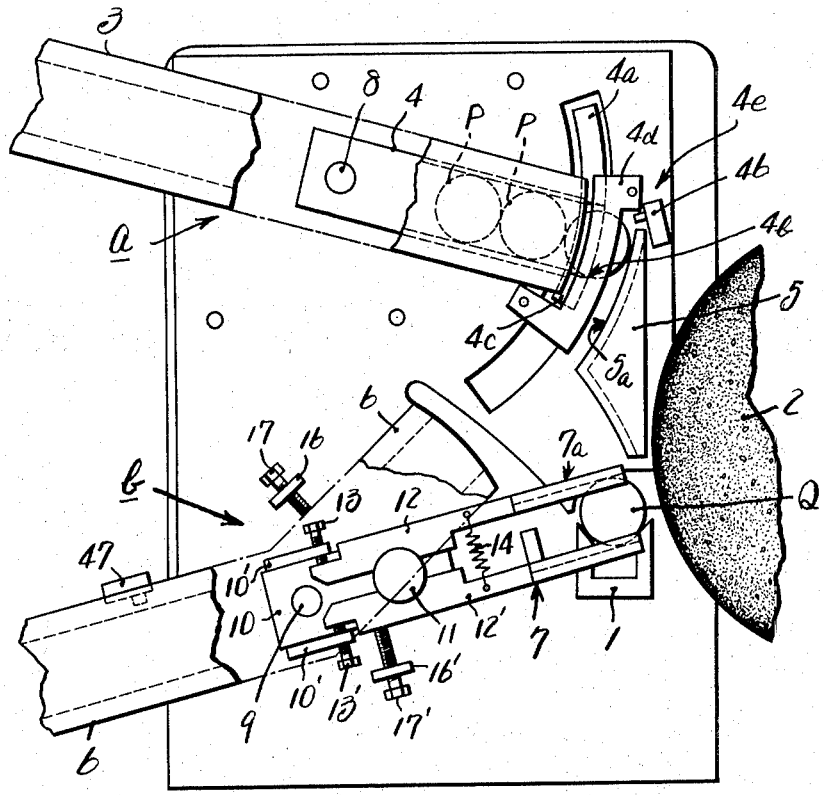
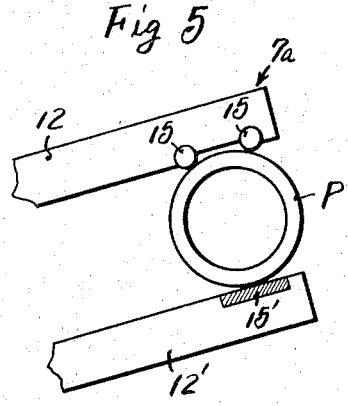

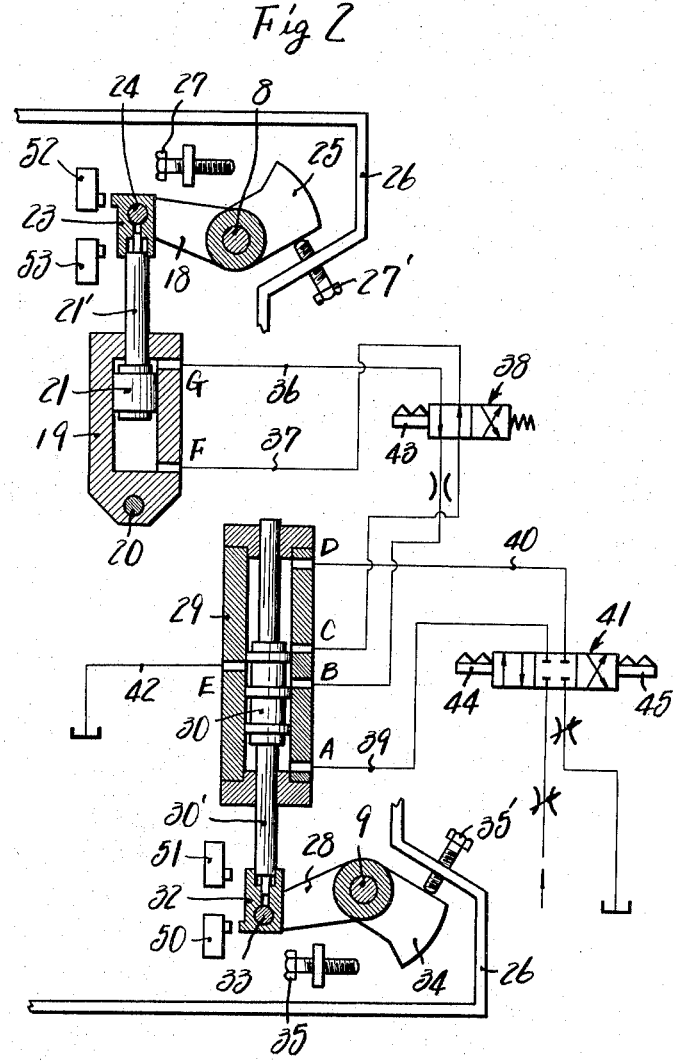
Fig. 2
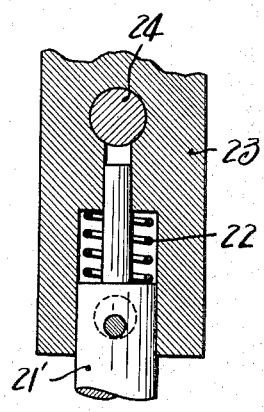
Fig. 3
Fig. 4

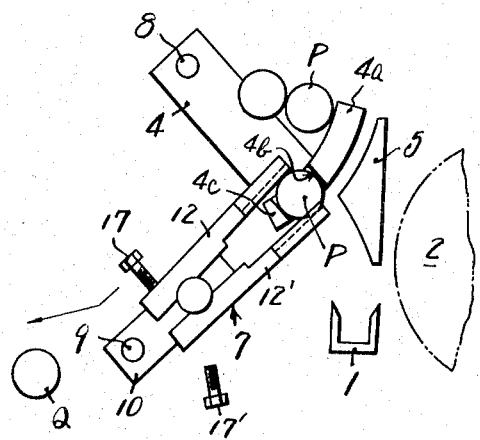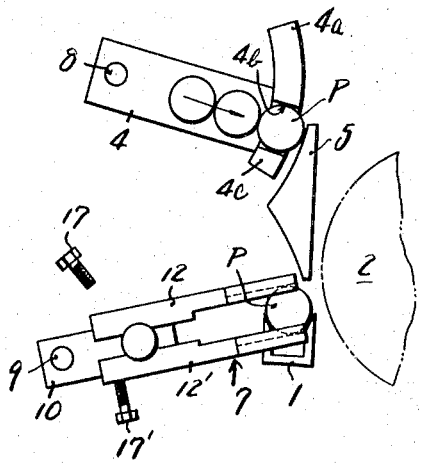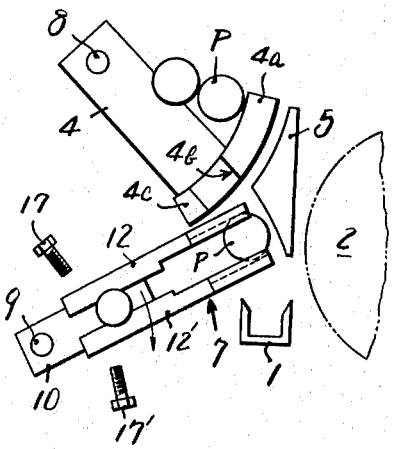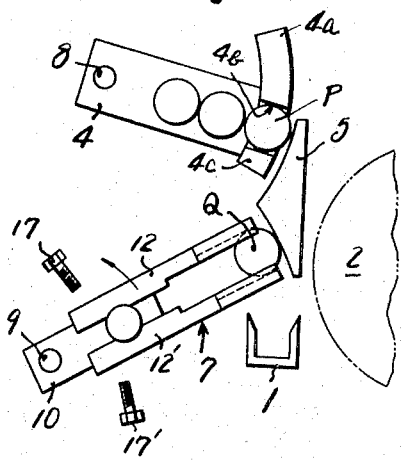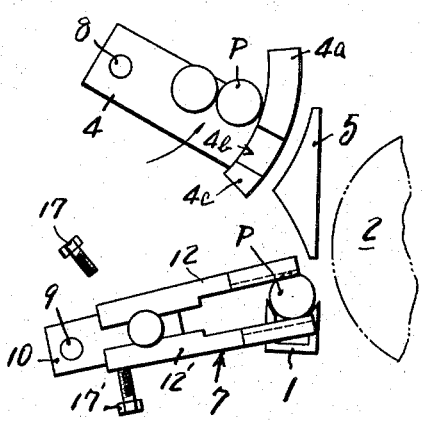

APPARATUS APPLIED TO MACHINE TOOLS AND OTHERS FOR TRANSFERING WORKPIECES

BACKGROUND OF THE INVENTION

1. Field of the Invention;

The present invention relates to an apparatus to be applied in machine tools and others for transfering the workpieces, in more particularly, an apparatus for transfering the workpieces from a feeding chute to the machining position thereof, then to a discharging chute from said machining position on completion of the machining.

Thus, the main purpose of the invention lies in automatically and continuously supplying substantially cylindrical objects one by one to a machining position of machine tools and others such as grinding machine and then discharging the same in stabilized operations.

2. Field of Prior Art;

In one of the conventional transfering apparatus, for the similar purpose, the workpieces are loaded into and discharged from the machining position under their own weight, thus frequently resulting in a faulty operation, e.g. misloading, especially when processing relatively lightweight workpieces.

In case of a system wherein the loading operation is carried out on completion of a gravitated discharge of the machined workpiece, the processing cycle is necessarily lengthened.

Besides, there is another system wherein the workpieces are held at the both ends thereof by two arms, the subsequent operations such as boring, is made impossible or at least significantly hindered.

SUMMARY OF THE INVENTION:

The purpose of the present invention is to eliminate or improve the aforementioned disadvantages experienced in the conventional apparatuses.

The apparatus according to the invention comprises a unit for taking out a first one of a group of workpieces aligned in a feeding chute and then distributing it to the delivery position, and another unit for receiving the workpiece from the distributing member at the delivery position to put the same into a machining position by a loading element, wbich rotably supports the workpiece being machined at the machining position.

One completion of the machining, the workpiece is then returned to said loading position from said machining position to be pushed out therefrom into a discharging chute by means of a dual-purposed motion of the distributing member for transfering the next workpiece to the loading position then empty since the first workpiece had been discharged therefrom.

Thus, the operations as described above are reciprocally repeated.

BRIEF DESCRIPTION OF THE DRAWING.

The attached drawings show a preferable embodiment of the present invention.

FIG. 1 is a front view of the essential portion of the apparatus according to the invention.

FIG. 2 is an explanatory drawing of the relative driving mechanisms of the distributing unit and loading unit.

FIGS. 3 and 4 are enlarged sections showing the shock-absorbing mechanisms for driving piston rod and swing lever respectively for the distributing and loading units in FIG. 2.

FIG. 5 is an enlarged drawing of the top portion of the loading element.

FIGS. 6 through 11 illustrate the serial operations of the distributing and loading elements in the order of the motions.

DESCRIPTION OF A PREFERRED EMBODIMENT.

In FIG. 1, the numeral 1 is used to denote a machining suppor for positioning the workpiece to the grinding machine, and 2 is used to denote a grinding wheel provided at the rear side thereof. Provided respectively at the upper and lower portions of the front side of the machining support 1 are a transfer-unit ($a$) consisting of each one of feeding chute 3, distributing member 4 and guide member 5, and another transfer-unit ($b$) consisting of a discharging chute 6 and a member 7 for loading and discharging the workpieces.

Said feeding chute 3 is fixedly secured in an inclined state toward the upper guiding surface $5a$ of guiding member 5 situated above said machining support 1, so that the cylindrical workpieces ($p$) positioned therein can successively roll down, and a clearance large enough for pushing out workpieces ($p$) one by one downwardly along said guiding surface $5a$ is provided between the lower end of the feeding chute 5 and the guiding surface $5a$.

The discharging chute 6 secured in an inclined state toward the subsequent process has a rear portion bent upwardly and fixedly situated on the downward extention from the guiding surface $5a$ with a clearance capable of delivering a workpiece ($p$) to the machining support 1, so that machined workpiece ($Q$) received in the opening at the rear end, that is, the upper end thereof can roll down to be discharged to the next process.

Provided at the top portion of the distributing member 4 pivoted by a rotable shaft 8 on one side of the feeding chute 3 is a transit unit $4e$ comprising a shutter $4a$ having a recess $4b$ therein, a pusher $4c$ and a side plate $4d$.

Said transit unit $4e$ interposed between the feeding chute 3 and the guiding surface $5a$ is adapted to reciprocate swings between these two elements to reach the area adjacent to the rear end of the distributing chute 6.

When the feeding chute 4 is positioned at the angle to commence transfer of a workpiece, that is, at the uppermost position of swing thereof, the opening of pocket $4b$ and the exit port of feeding chute 3 corresponding each other in the dimentions are aligned to receive a first workpiece rolling down from the latter into said opening of pocket $4b$, which workpiece, then, is held at the both lateral sides thereof by the side plates $4d$, when it hits the guiding surface $5a$.

A cresent-shaped projection having the rotary shaft 8 as its axis, and provided on the upper portion of shutter $4a$ beyond the recess $4b$ prevents any irregular rolling out of the subsequent workpieces ($p$) by constantly shutting the exit port of the feeding chute 3 while said recess $4b$ reciprocates along the likewise cresent-shaped guiding surface $5a$.

The pusher $4c$ adapted to project beneath the recess $4b$ performs a pushing motion for delivery of workpieces, as will be described later. Between the movable elements and the fixed elements opposing thereto, or between mutually moving elements, e.g., the top portion of the feeding chute 3, the components comprising the transit units 4e and others, proper clearances are respectively provided so as not to disturb any of the smooth operations thereof.

On one side of the discharging chute 6, a loading element 7 is pivoted by a rotable shaft 9 to permit vertical swings thereof. Said loading element 7 has a main piece 10 integrally secured to a rotable shaft 9 at the base portion thereof, and a fulcrum 11 projecting near the top portion thereof, which fulcrum 11 being put between opposing crecent shaped recesses provided near the rear portion of two fingers 12, 12', which are pulled toward each other by a spring 14 at the respective middle portions thereof.

On the lateral projections 10' of the main piece 10 located at the respective remote or lower ends of fingers 12, 12' are threaded stoppers 13, 13' for the purpose of adjusting the clearance between the top ends of the fingers so that it be maintained slightly smaller than the diameter of workpiece (P).

As shown in FIG. 5, two cylindrical hard metal elements 15 are laid in parallel with a proper distance therebetween and with their surfaces partially exposed, while, a plain hard metal element 15' is laid along the center line of the opposing portion of lower finger 12' with its exposed surface on the same level as the upper surface of said lower finger 12', thus composing a holding element 7a to firmly hold a cylindrical workpiece by three points and, further, to facilitate pushing out of the workpiece as will be described later.

Next, the construction adopted for the opening and closing motions of two fingers 12, 12' is as follows.

In FIG. 1, at the opposing extremes of the swing motion of loading element 7 which swings making the rotable shaft 9 its axis, threaded stops 17, 17' are adjustably screwed in the respective brackets 16, 16' secured on a fixed side wall.

More particularly, the relative positions of said stoppers 17, 17' with respect to the two fingers 12, 12' are such that, when the loading element 7 comes to the upper or the lower extremes of swing thereof, the rear top side of upper finger 12 hits against said upper stopper 17, and the rear bottom side of the lower finger 12' hits against said lower stopper 17', respectively on the intermediate portions between the fulcrum 11 and rotable shaft 9.

With the relative positions of stoppers 17, 17' and fingers 12, 12' of loading element 7, as stated above, the serial operations of said fingers will next be described.

In a state as shown in FIG. 6, the distance between the top ends of fingers 12, 12' is widened when the rear top side of upper finger 12 hits against upper stopper 17 to enlarge the opening angle of upper finger 12 with respect to main piece 10, while the relative position of lower finger 12 with said main piece 10 being unchanged owing to stopper 13' as shown in FIG. 1.

FIG. 7 shows two fingers 12, 12' being free from the stoppers 17, 17' and firmly holding therebetween a workpiece to be machined by virtue of spring 14.

Under the stages as ween in FIGS. 8 and 9, the rear bottom side of lower finger 12' hits against the lower stopper 17' and the opening angle of said two fingers 12, 12' is enlarged, and the workpiece (P) is sustained by machining support 1.

In FIG. 10, a machined workpiece (Q) is firmly held by the top portions of said two fingers closed to the original state.

And in FIG. 11, the top portions of the fingers are being opened to be restored to the state as shown in FIG. 6.

The driving mechanism for distributing member 4 and loading element 7 will now be described.

A lever 18 integrally secured on rotable shaft 8 of distributing member 4 is driven by a hydraulic cylinder 19 which is vertically mounted on a pivot 20 at the lower end thereof to permit lateral swings of the same equipped with an upwardly projecting rod 21' of piston 21, as illustrated in FIG. 2.

Mounted at the top portion of said piston rod 21' capable of shifting in the axial direction is a cap-shaped rod 23, in which a spring 22 destined for the mutual connection and shock absorption between said rods 21' and 23 is contained. See FIG. 3.

The both top portions of said cap-shaped rod 23 and lever 18 are rotably connected by a pin 24.

Another lever 25 fixedly secured on the rotable shaft 8 regulates the swinging motion of distributing member 4 and is confronted by threaded stoppers 27, 27' provided on frame 26.

On the other hand, rotable shaft 9 of the loading element 7 has a lever 28 secured thereto, and a hydraulic cylinder 29 is vertically disposed at the top portion of said lever 28 so as to be permitted swinging motion thereof.

As shown in FIG. 4, the rod 30' of piston 30 and lever 28 are connected by means of swinging shaft 33 and casing 32 containing a spring 31 which serves as a shock absorber.

A lever 34 for regulating the swinging range of loading element 7 is fixedly secured on rotable shaft 9 and confronts with stoppers 35, 35' disposed on frame 26.

Two ports, (G), (F) respectively provided at the longitudinal both ends of the compartment of hydraulic cylinder 19 for the distributing member and the two ports (C), (B) provided at the intermediate area of the compartment of cylinder 29 for the loading element are connected by conduit tubes 36, 37 and a change-over magnet valve 38 is disposed therebetween.

Two other conduit tubes 39, 40 led from the said two ports (A), (D) bored at the both longitudinal end areas of hydraulic cylinder 29 are respectively connected to a hydraulic pressure source and a oil tank, with a changeover magnet valve 41 being interposed therebetween, while another conduit tube 42 from a port (E) bored at the middle area of said cylinder 29 is connected to another oil tank.

Described next is the operational movements of ditributing member 4 and loading element 7 through the respective changeover magnet valves 38, 41.

FIG. 6 is the first stage of said operational movements wherein loading element 7 is at the uppermost position thereof with the upper finger 12 being urged upwardly by stopper 17, and the top part of distributing member 4 is interposed between upper and lower fingers 12, 12'. On the other hands, the distributing member 4 is at its lowest position and the pocket 4b disposed at the top thereof and having therein a workpiece (P) to be machined is placed just between the two fingers 12, 12'.

The operational process of the relative elements to realized the state as shown in FIG. 6 will be described with respect to FIG. 2. Firstly, solenoid 45 of changeover magnet valve 41 is actuated and presured oil from said pressure source is delivered through conduit tube 40 into the upper compartment of hydraulic cylinder 29 via port (D) of said cylinder 29 to push down piston 30.

When the piston 30 comes to the lowermost postion thereof, solenoid 43 of changeover magnet valve 38 is actuated by detector 50 and the pressured oil delivered through in the order of conduit tube 40, port (D) port (C), and conduit 37, then port (F) of hydraulic cylinder 19 to push piston 21 upwardly.

Through the operations as set forth above, solenoid 45 is actuated by a signal indicating completion of a required machining of workpiece (P), by the grinding wheel, which signal being issued immediately after said completion.

Shown in FIG. 7 is a state wherein the loading element 7 only has started to swing downwardly, that is, to the loading situation, leaving the stopper 17 behind to restore the original parallel state of two fingers 12, 12', thus holding therebetween a workpiece (P) which had been in the pocket 4b of distributing member 4.

The operation from FIG. 6 to FIG. 7 will further be described with respect to FIG. 2.

When the piston 21 reaches the uppermost position in the hydraulic cylinder 19, detector 52 is actuated to excite solenoid 44 of change-over magnet valve 41, and pressured oil from the pressure source is delivered into the lower compartment of hydraulic cylinder 29 through port (A) via conduit tube 39 to raise piston 30.

Then, the aforementioned raise of piston 30 entails deactivations of detector 50 as well as of solenoid 43 of changeover magnet valve 38, thus the oil circuits of hydraulic cylinder 19 are changed over to connect port (F) of hydraulic cylinder 19 with port (B) of hydraulic cylinder 29, and port (G) with port (C), respectively.

However, since the pressured oil in the lower compartment of hydraulic cylinder 19 is in a locked-up condition as the result of said upward shift of piston 30, the distributing member 4 is at the lowest position in FIG. 7.

FIG. 8 is a resultant stage succesively carried out from the state of FIG. 7 and shows loading element 7 loading a workpiece (P) onto the machining support 1 to be machined, when, in FIG. 2, piston 30 of hydraulic cylinder 29 arrives at the uppermost position to activate detector 51, whereby solenoid 43 of changeover magnet valve 38 is excited again and at the same time, grinding wheel is urged to the grinding position.

First, the operations of relevant elements with respect to said excitement of solenoid 43 is as following.

When the piston 30 reaches the uppermost position, ports (A) and (B) of cylinder 29 is connected each other, thus the pressured oil from the pressure source is delivered into the upper compartment of cylinder 19 from port (G) via ports (A), (B) of cylinder 29 and conduit tube 36 to push down piston 21.

Throughout the operation above, the electric circuit of solenoid 44 is kept activated, thus the decending motion of piston 21 is performed in succession, and distributing member 4 is swung upwardly.

The state as shown in FIG. 9 is achieved when piston 21 reaches the lowermost position thereof to activate detector 53, which then issues a signal to cut the self-maintaining circuit of solenoid 44 of changeover magnet valve 41.

Thus, the magnet valve 41 is restored to its neutral aspect and the hydraulic pressure circuit is locked up, whereby piston 21 of cylinder 19 and piston 30 of cylinder 29 are held at the lowermost and the uppermost positions respectively.

The workpiece (P) placed upon the machining support 1 is machined under the above condition as shown in FIG. 9, when the lower finger 12' of loading element 7 is in contact with stopper 17' and the hard metal 15' at the top thereof is away from the workpiece (P), which, however, is prevented from being displaced by virtue of upper finger 12 pressing it down through two hard metals 15, 15 onto machining support 1.

On completion of said machining, solenoid 45 of changeover magnet valve 41 is excited, whereby pressured oil from the pressure source is delivered via conduit tube 40 into the upper compartment of cylinder 29 through port (D) to push down piston 30.

Accordingly, as shown in FIG. 10, loading element 7 swings upwardly, making the lower finger 12' free from stopper 17' to hold the machined workpiece (Q) and to take the same out from machining support 1.

When piston 30 starts being pushed down, detector 51 and solenoid 43 of change-over magnet valve 38 are disactivated so that ports (B), (F) and ports (C), (G) are respectively connected through.

However, piston 21 of cylinder 19 stays at the lowermost position thereof since port (C) is disconnected from port (E) owing to the decent of piston 30.

The state shown in FIG. 11 is realized when piston 30 reaches lowermost position and loading element 7 reaches uppermost position respectively thereof.

Then, detector 50 is activated to excite solenoid 43 of changeover magnet valve 38, whereby port (C) is connected with port (F), and port (G) is connected with port (E) via port (B).

While, ports (C) and (D) are being connected through as a result of the arrival of said piston 30 at lowermost position thereof.

Accordingly, the pressure oil forcibly delivered from the pressure source enters into port (F) of cylinder 19 through conduit (40), port (D), port (C) and conduit 37 to push up piston 21, whereby distributing member 4 begins to swing downwardly.

When piston 21 reaches uppermost position thereof, distributing member 4 is brought between the two fingers 12, 12' of loading element 7 as indicated in FIG. 6, and the machined workpiece (Q) held between the two fingers 12, 12' of loading element 7 is pushed out toward the discharging chute 6 by means of pusher 4c provided on distributing member 4.

At the same time, detector 52 appeared in FIG. 2 is activated to disconnect the electric circuit of solenoid 45 of changeover magnet valve 41, while connecting the circuit of solenoid 44.

Consequently, the pressured oil from the pressure source enters into port (A) of cylinder 29 through conduit 39, and thus, piston 30 is pushed up to realize the state as shown in FIG. 7 making the loading element 7 swing downwardly.

Thenceforth, the aforementioned operations are repeated in succession.

To sum up, the relative operations of hydraulic cylinders 19 and 29 are performed in such a manner that, when the uppermost end (or lowermost end) is reached by piston 30 of cylinder 29 which has initiated its ascending (or descending) motion first, piston 21 of cylinder 19 begins to ascend (or descend). In other words, cylinder 29 acts as a sequence valve of cylinder 19.

Operation of the grinding machine is initiated by pushing a statter button which, like the signal issued on completion of a machining operation as mentioned before, actuates solenoid 45 of changeover magnet valve 41 in FIG. 2, whereby loading element 7 and distributing member 4 are brought to the state as shown in FIG. 6 to have those components carry out the aforementioned operations thereafter.

In FIG. 1, provided above guiding element 5 is a detector 46 of non-contact type which is destined to check existence of workpiece (P) to be machined in pocket 4b of distributing member 4, so as to prevent disributing motion of the distributing member 4, when there is no workpiece (P) in pocket 4b, thus any unloaded motion of distributing member 4 and of loading element 7 are avoided.

While, detector 47 is provided on the discharging chute 6 for the purpose of checking up any possible clogging of machined workpieces (Q) around the inlet port of discharging chute 6 or between movable parts of the apparatus, which clogging necessarily disturbes satisfactory operations of the same.

The distibuting member 4 is adapted so as to be prevented from carrying out the subsequent operation in the event of a machined workpiece (Q) not passing through detector 47 of discharging chute 6 prior to commencement of the discharging motion for the next machined workpiece. When an apparatus according to the present invention having the construction and to be operated as described above is applied to a grinding machine, a cooling medium can be supplied through the clearance between guiding member 5 for workpiece (P) to be machined and grinding wheel 2, whereby it is possible to supply said cooling medium onto the portions under machining without being blown away by air current generated around the grinding wheel 2, and also to apply the cutting tool or the grinding wheel onto any portions of the workpiece (P), such as the bore, side portions or cylindrical surface respectively thereof without being hampered by the two fingers 12, 12' and/or machining support 1.

Further, since the loading and discharge of workpieces (P) are carried out forcibly by the respective swinging motions of distributing member 4 and loading element 7 on the same common plane, the working time required therefor is extremely shortened, thus significantly speeding up the operation cycle.

While there has been described herein an embodiment which an apparatus according to the present invention is applied to a grinding machine, it is to be understood that the exemplary embodiemnt is illustrative and not restrictive of the invention and that said apparatus may be adaptable without departing the essence of the invention to any other machine tools, provided that the device thereof for supporting the workpiece onto the machining position is of such types as, for example, claw chucks, shoe-magnet support or shoe-pressure clamping support.

We claim;

1. Apparatus operatively associated with a machine tool unit and the like for feeding a plurality of workpieces one at a time to an operating part of the machine and for sequentially discharging each workpiece after it has been machined, said apparatus comprising a transfer unit having fixed inclined chute means for receiving a plurality of workpieces in longitudinally aligned relationship therein, distribution means associated with said chute means adjacent the discharge end thereof in pivotal relationship, therewith for moving workpieces downwardly from said chute means in the direction of said machine tool unit, guide means spaced from the discharge end of said distribution means in opposed relationship therewith to aid in the downward movement of a workpiece individually in the direction of the machine tool unit, and means to move said distribution means down and up in controlled relationship, a discharging unit downwardly spaced from said transfer unit for receiving a workpiece therefrom, said discharging unit including chute means for receiving workpieces individually after being machined, workpiece receiving means pivotally mounted adjacent the workpiece receiving entrance of said chute means, and means for moving said workpiece receiving means upwardly in timed relation with the downward movement of said distribution means of said transfer unit for receiving an individual workpiece therefrom, said apparatus further including a machining support associated with the free end of said workpiece receiving means for receiving and retaining an individual workpiece while same is being machined, and means for passing the machined workpiece into the chute means of said discharging unit for discharge therefrom.

2. Apparatus in accordance with claim 1, wherein said workpiece receiving means includes a pair of spaced finger elements for receiving a workpiece therebetween, and means to expand and contract said finger elements to release and retain a workpiece respectively.

3. Apparatus in accordance with claim 1, which further includes means to control the passing of a workpiece from said distribution means of said transfer unit to the workpiece receiving means of said discharging unit to prevent the passing of a workpiece to be machined when a machined workpiece is retained within the workpiece receiving means.

4. Apparatus in accordance with claim 2, in which the opposed free ends of the spaced finger elements are provided with means to positively engage the surface of a workpiece at three points.

5. Apparatus in accordance with claim 2, wherein said apparatus includes means to push a workpiece after being machined out from between the spaced finger elements into the chute means of said discharge element.

6. Apparatus in accordance with claim 1, which includes shutter means adjacent the discharge end of said chute means to close the discharge end thereof during the transfer of a workpiece to be machined.

* * * * *